(12) United States Patent
Albsmeier et al.

(10) Patent No.: US 7,777,623 B2
(45) Date of Patent: Aug. 17, 2010

(54) WIRELESS SENSOR SYSTEM

(75) Inventors: Andre Albsmeier, Munich (DE); Wolf-Eckhart Bulst, Munich (DE); Klaus Pistor, Linden (DE); Frank Schmidt, Pöring (DE); Oliver Sczesny, Aschheim (DE)

(73) Assignee: EnOcean GmbH, Oberhaching (DE)

(*) Notice: Subject to any disclaimer, the term of this patent is extended or adjusted under 35 U.S.C. 154(b) by 0 days.

(21) Appl. No.: 11/805,520

(22) Filed: May 23, 2007

(65) Prior Publication Data

US 2007/0222584 A1    Sep. 27, 2007

Related U.S. Application Data

(63) Continuation of application No. 10/492,327, filed as application No. PCT/DE02/03732 on Sep. 22, 2004, now Pat. No. 7,230,532.

(30) Foreign Application Priority Data

Oct. 11, 2001    (DE) ............................. 101 50 128

(51) Int. Cl.
*G08B 1/08* (2006.01)
(52) U.S. Cl. .................. 340/539.26; 340/443; 340/500; 340/870.01
(58) Field of Classification Search ............ 340/539.26, 340/870.01, 441, 443, 500, 425.5
See application file for complete search history.

(56) References Cited

U.S. PATENT DOCUMENTS

| 1,872,527 | A | 8/1932 | Techmert |
| 2,565,158 | A | 8/1951 | Williams |
| 2,813,242 | A | 11/1957 | Crump |
| 2,874,292 | A | 2/1959 | Varely |
| 2,995,633 | A | 8/1961 | Puharich et al. |

(Continued)

FOREIGN PATENT DOCUMENTS

DE        3231117        7/1920

(Continued)

OTHER PUBLICATIONS

Gerald F. Ross et al., Batteryless Sensor for Intrusion Detection and Assessment of Threats, http://stinet.dtic.mil/oai/oai?verb= getRecord&metadataPrefix=html&identifier=ADA301759, Nov. 1, 1995.

(Continued)

*Primary Examiner*—Eric M Blount
(74) *Attorney, Agent, or Firm*—Cohen Pontani Lieberman & Pavane LLP

(57) ABSTRACT

A sensor system has a least one voltage generator for conversion of non-electrical energy to electrical energy. At least one energy store is connected downstream from the voltage generator. At least one voltage converter is connected to the energy store such that its output signal is suitable for operation of a processor controller. At least one sensor is provided, and at least one transmitter enables wire-free transmission of transmission messages produced by the processor controller and containing at least one measured value from the at least one sensor. A timer circuit is triggered as a function of a voltage level of the at least one energy store, and activates the sensor system to transmit at least one transmission message after a specific time interval.

13 Claims, 1 Drawing Sheet

U.S. PATENT DOCUMENTS

| | | |
|---|---|---|
| 3,077,574 A | 2/1963 | Marks |
| 3,093,760 A | 6/1963 | Tarasevich |
| 3,219,850 A | 11/1965 | Langevin |
| 3,230,455 A | 1/1966 | Kosta, Jr. |
| 3,270,283 A | 8/1966 | Ikrath et al. |
| 3,315,166 A | 4/1967 | Crump |
| 3,370,567 A | 2/1968 | Reith |
| 3,456,134 A | 7/1969 | Ko |
| 3,553,588 A | 1/1971 | Honig |
| 3,596,262 A | 7/1971 | Rollwitz et al. |
| 3,614,760 A | 10/1971 | Zimmet |
| 3,621,398 A | 11/1971 | Willis |
| 3,624,451 A | 11/1971 | Gauld |
| 3,633,106 A | 1/1972 | Willis |
| 3,697,975 A | 10/1972 | Bernstein et al. |
| 3,735,412 A | 5/1973 | Kampmeyer |
| 3,781,836 A | 12/1973 | Kruper et al. |
| 3,781,955 A | 1/1974 | Lavrinenko et al. |
| 3,783,211 A | 1/1974 | Panettieri |
| 3,796,958 A | 3/1974 | Johnston et al. |
| 3,818,467 A | 6/1974 | Willis |
| 3,824,857 A | 7/1974 | Smith |
| 3,827,038 A | 7/1974 | Willis |
| 3,866,206 A | 2/1975 | DeGiorgio et al. |
| 3,928,760 A | 12/1975 | Isoda |
| 3,949,247 A | 4/1976 | Fenner et al. |
| 3,970,939 A | 7/1976 | Willis |
| 3,971,028 A | 7/1976 | Funk |
| 3,986,119 A | 10/1976 | Hemmer, Jr. et al. |
| 3,989,963 A | 11/1976 | Giaccardi |
| 4,001,798 A * | 1/1977 | Robinson ............... 340/870.18 |
| 4,004,458 A | 1/1977 | Knothe et al. |
| 4,160,234 A * | 7/1979 | Karbo et al. ............... 340/443 |
| 4,177,438 A | 12/1979 | Vittoria |
| 4,177,800 A | 12/1979 | Enger |
| 4,210,898 A | 7/1980 | Betts |
| 4,220,907 A | 9/1980 | Pappas |
| 4,231,260 A | 11/1980 | Chamuel |
| 4,237,728 A | 12/1980 | Betts et al. |
| 4,257,010 A | 3/1981 | Bergman et al. |
| 4,259,715 A | 3/1981 | Morokawa |
| 4,300,119 A * | 11/1981 | Wiernicki ................. 340/447 |
| 4,349,762 A | 9/1982 | Kitamura et al. |
| 4,355,309 A | 10/1982 | Hughey et al. |
| 4,371,814 A | 2/1983 | Hannas |
| 4,412,355 A | 10/1983 | Terbrack et al. |
| 4,433,719 A | 2/1984 | Cherry et al. |
| 4,471,353 A | 9/1984 | Cernik |
| 4,489,269 A | 12/1984 | Edling et al. |
| 4,504,761 A | 3/1985 | Triplett |
| 4,510,484 A | 4/1985 | Snyder |
| 4,521,712 A | 6/1985 | Braun et al. |
| 4,524,283 A | 6/1985 | Latvus |
| 4,595,864 A | 6/1986 | Stiefelmeyer et al. |
| 4,612,472 A | 9/1986 | Kakizaki et al. |
| 4,626,698 A | 12/1986 | Harnden, Jr. et al. |
| 4,701,681 A | 10/1987 | Koike |
| 4,704,543 A | 11/1987 | Barker et al. |
| 4,739,211 A | 4/1988 | Strachan |
| 4,748,366 A | 5/1988 | Taylor |
| 4,786,837 A | 11/1988 | Kalnin et al. |
| 4,870,700 A | 9/1989 | Ormanns et al. |
| 4,878,052 A | 10/1989 | Schulze |
| 5,012,223 A | 4/1991 | Griebell et al. |
| 5,118,982 A | 6/1992 | Inoue et al. |
| 5,136,202 A | 8/1992 | Carenzo et al. |
| 5,146,153 A | 9/1992 | Luchaco et al. |
| 5,151,695 A | 9/1992 | Rollwitz et al. |
| 5,237,264 A | 8/1993 | Moseley et al. |
| 5,262,696 A | 11/1993 | Culp |
| 5,278,471 A | 1/1994 | Uehara et al. |
| 5,289,160 A | 2/1994 | Fiorletta |
| 5,301,362 A | 4/1994 | Ohkawa |
| 5,317,303 A | 5/1994 | Ross et al. |
| 5,327,041 A | 7/1994 | Culp |
| 5,339,073 A | 8/1994 | Dodd et al. |
| 5,431,694 A | 7/1995 | Snapper et al. |
| 5,471,721 A | 12/1995 | Haertling |
| 5,491,486 A | 2/1996 | Welles, II et al. |
| 5,499,013 A | 3/1996 | Konotchick |
| 5,535,627 A | 7/1996 | Swanson et al. |
| 5,546,070 A | 8/1996 | Ellmann et al. |
| 5,548,189 A | 8/1996 | Williams |
| 5,563,600 A | 10/1996 | Miyake |
| 5,569,854 A | 10/1996 | Ishida et al. |
| 5,572,190 A | 11/1996 | Ross et al. |
| 5,573,611 A | 11/1996 | Koch et al. |
| 5,578,877 A | 11/1996 | Tiemann |
| 5,581,023 A | 12/1996 | Handfield et al. |
| 5,581,454 A | 12/1996 | Collins |
| 5,589,725 A | 12/1996 | Haertling |
| 5,592,169 A | 1/1997 | Nakamura et al. |
| 5,605,336 A | 2/1997 | Gaoiran et al. |
| 5,631,816 A | 5/1997 | Brakus |
| 5,632,841 A | 5/1997 | Hellbaum et al. |
| 5,664,570 A | 9/1997 | Bishop |
| 5,675,296 A | 10/1997 | Tomikawa |
| 5,708,676 A | 1/1998 | Minamitani et al. |
| 5,717,258 A | 2/1998 | Park |
| 5,725,482 A | 3/1998 | Bishop |
| 5,731,691 A | 3/1998 | Noto |
| 5,734,445 A | 3/1998 | Neill |
| 5,749,547 A | 5/1998 | Young et al. |
| 5,751,092 A | 5/1998 | Abe |
| 5,781,646 A | 7/1998 | Face |
| 5,797,201 A | 8/1998 | Huang |
| 5,801,475 A * | 9/1998 | Kimura .................... 310/319 |
| 5,814,922 A | 9/1998 | Uchino et al. |
| 5,816,780 A | 10/1998 | Bishop et al. |
| 5,831,371 A | 11/1998 | Bishop |
| 5,834,882 A | 11/1998 | Bishop |
| 5,835,996 A | 11/1998 | Hashimoto et al. |
| 5,839,306 A | 11/1998 | Nunuparov |
| 5,844,516 A | 12/1998 | Viljanen |
| 5,849,125 A | 12/1998 | Clark |
| 5,854,994 A | 12/1998 | Canada et al. |
| 5,861,702 A | 1/1999 | Bishop et al. |
| 5,861,704 A | 1/1999 | Kitami et al. |
| 5,872,513 A | 2/1999 | Fitzgibbon et al. |
| 5,886,647 A | 3/1999 | Badger et al. |
| 5,886,847 A | 3/1999 | Lee et al. |
| 5,892,318 A | 4/1999 | Dai et al. |
| 5,905,442 A | 5/1999 | Mosebrook et al. |
| 5,911,529 A | 6/1999 | Crisan |
| 5,918,592 A | 7/1999 | Kazubski et al. |
| 5,923,542 A | 7/1999 | Sasaki et al. |
| 5,933,079 A | 8/1999 | Frink |
| 5,939,816 A | 8/1999 | Culp |
| 5,939,818 A | 8/1999 | Hakamata |
| 5,949,516 A | 9/1999 | McCurdy |
| 5,962,951 A | 10/1999 | Bishop |
| 5,982,355 A | 11/1999 | Jaeger et al. |
| 5,995,017 A | 11/1999 | Marsh et al. |
| 5,998,938 A | 12/1999 | Comberg et al. |
| 6,014,896 A | 1/2000 | Schoess |
| 6,025,783 A | 2/2000 | Steffens, Jr. |
| 6,028,506 A | 2/2000 | Xiao |
| 6,030,480 A | 2/2000 | Face, Jr. et al. |
| 6,037,706 A | 3/2000 | Inoi et al. |
| 6,040,654 A | 3/2000 | Le Letty |
| 6,042,345 A | 3/2000 | Bishop et al. |
| 6,052,300 A | 4/2000 | Bishop et al. |
| 6,054,796 A | 4/2000 | Bishop |
| RE36,703 E | 5/2000 | Heitschel et al. |

| | | | |
|---|---|---|---|
| 6,071,088 A | 6/2000 | Bishop et al. | |
| 6,074,178 A | 6/2000 | Bishop et al. | |
| 6,075,310 A | 6/2000 | Bishop | |
| 6,079,214 A | 6/2000 | Bishop | |
| 6,084,530 A | 7/2000 | Pidwerbetsky et al. | |
| 6,087,757 A | 7/2000 | Honbo et al. | |
| 6,101,880 A | 8/2000 | Face, Jr. et al. | |
| 6,111,967 A | 8/2000 | Face, Jr. et al. | |
| 6,112,165 A * | 8/2000 | Uhl et al. | 702/138 |
| 6,114,798 A | 9/2000 | Maruyama et al. | |
| 6,122,165 A | 9/2000 | Schmitt et al. | |
| 6,124,678 A | 9/2000 | Bishop et al. | |
| 6,127,771 A | 10/2000 | Boyd et al. | |
| 6,140,745 A | 10/2000 | Bryant | |
| 6,144,142 A | 11/2000 | Face, Jr. et al. | |
| 6,150,752 A | 11/2000 | Bishop | |
| 6,156,145 A | 12/2000 | Clark | |
| 6,182,340 B1 | 2/2001 | Bishop | |
| 6,188,163 B1 | 2/2001 | Danov | |
| 6,213,564 B1 | 4/2001 | Face, Jr. | |
| 6,215,227 B1 | 4/2001 | Boyd | |
| 6,229,247 B1 | 5/2001 | Bishop | |
| 6,245,172 B1 | 6/2001 | Face, Jr. | |
| 6,246,153 B1 | 6/2001 | Bishop et al. | |
| 6,252,336 B1 | 6/2001 | Hall | |
| 6,252,358 B1 | 6/2001 | Xydis et al. | |
| 6,255,962 B1 | 7/2001 | Tanenhaus et al. | |
| 6,257,293 B1 | 7/2001 | Face, Jr. et al. | |
| 6,259,372 B1 * | 7/2001 | Taranowski et al. | 340/683 |
| 6,278,625 B1 | 8/2001 | Boyd | |
| 6,304,176 B1 | 10/2001 | Discenzo | |
| 6,323,566 B1 | 11/2001 | Meier | |
| 6,326,718 B1 | 12/2001 | Boyd | |
| 6,362,559 B1 | 3/2002 | Boyd | |
| 6,366,006 B1 | 4/2002 | Boyd | |
| 6,392,329 B1 | 5/2002 | Bryant et al. | |
| 6,396,197 B1 | 5/2002 | Szilagyi et al. | |
| 6,407,483 B1 | 6/2002 | Nunuparov et al. | |
| 6,438,193 B1 | 8/2002 | Ko et al. | |
| 6,462,792 B1 | 10/2002 | Ban et al. | |
| 6,529,127 B2 * | 3/2003 | Townsend et al. | 340/505 |
| 6,567,012 B1 | 5/2003 | Matsubara et al. | |
| 6,570,386 B2 * | 5/2003 | Goldstein | 324/415 |
| 6,573,611 B2 | 6/2003 | Sohn et al. | |
| 6,611,556 B1 | 8/2003 | Koerner et al. | |
| 6,614,144 B2 | 9/2003 | Carazo | |
| 6,617,757 B2 | 9/2003 | Carazo et al. | |
| 6,630,894 B1 | 10/2003 | Boyd et al. | |
| 6,684,994 B1 | 2/2004 | Nunuparov | |
| 6,700,310 B2 | 3/2004 | Maue et al. | |
| 6,731,708 B1 | 5/2004 | Watanabe | |
| 6,747,573 B1 * | 6/2004 | Gerlach et al. | 340/870.21 |
| 6,756,930 B1 | 6/2004 | Nunuparov et al. | |
| 6,768,419 B2 | 7/2004 | Garber et al. | |
| 6,812,594 B2 | 11/2004 | Face et al. | |
| 6,856,291 B2 | 2/2005 | Mickle et al. | |
| 6,861,785 B2 | 3/2005 | Andre et al. | |
| 6,882,128 B1 * | 4/2005 | Rahmel et al. | 320/101 |
| 6,933,655 B2 | 8/2005 | Morrison et al. | |
| 6,992,423 B2 * | 1/2006 | Mancosu et al. | 310/339 |
| 7,005,778 B2 | 2/2006 | Pistor | |
| 7,019,241 B2 | 3/2006 | Grassl et al. | |
| 7,084,529 B2 | 8/2006 | Face et al. | |
| 7,230,532 B2 | 6/2007 | Albsmeier | |
| 7,245,062 B2 | 7/2007 | Schmidt | |
| 7,389,674 B2 | 6/2008 | Bulst et al. | |
| 7,391,135 B2 | 6/2008 | Schmidt | |
| 7,392,022 B2 | 6/2008 | Albsmeier et al. | |
| 2001/0003163 A1 | 6/2001 | Bungert et al. | |
| 2002/0021216 A1 | 2/2002 | Vossiek et al. | |
| 2002/0070712 A1 | 6/2002 | Arul | |
| 2003/0105403 A1 * | 6/2003 | Istvan et al. | 600/509 |
| 2003/0143963 A1 * | 7/2003 | Pistor et al. | 455/127 |
| 2003/0193417 A1 | 10/2003 | Face et al. | |
| 2004/0174073 A9 | 9/2004 | Face et al. | |
| 2004/0242169 A1 | 12/2004 | Albsmeier et al. | |
| 2005/0030177 A1 | 2/2005 | Albsmeier et al. | |
| 2005/0035600 A1 | 2/2005 | Albsmeier et al. | |
| 2005/0067949 A1 | 3/2005 | Natarajan et al. | |
| 2005/0253486 A1 | 11/2005 | Schmidt | |
| 2005/0253503 A1 | 11/2005 | Stegamat et al. | |
| 2006/0018376 A1 | 1/2006 | Schmidt | |
| 2006/0037380 A1 | 2/2006 | Bulst | |
| 2006/0091984 A1 | 5/2006 | Schmidt | |
| 2006/0109654 A1 | 5/2006 | Coushaine et al. | |
| 2008/0264148 A1 | 10/2008 | Bulst | |

FOREIGN PATENT DOCUMENTS

| | | |
|---|---|---|
| DE | 2436225 | 2/1975 |
| DE | 2421705 | 11/1975 |
| DE | 2943932 | 6/1980 |
| DE | 3016338 | 11/1980 |
| DE | 2942932 | 5/1981 |
| DE | 3643236 | 7/1988 |
| DE | 3736244 | 5/1989 |
| DE | 3741324 | 6/1989 |
| DE | 4017670 | 12/1991 |
| DE | 4034100 | 4/1992 |
| DE | 420 44 63 | 8/1992 |
| DE | 4105339 | 8/1992 |
| DE | 4232127 | 3/1994 |
| DE | 4309006 | 9/1994 |
| DE | 4312596 | 10/1994 |
| DE | 4429029 | 2/1996 |
| DE | 19619 311 | 12/1996 |
| DE | 19619311 | 12/1996 |
| DE | 19620880 | 11/1997 |
| DE | 29712270 | 11/1997 |
| DE | 198 26 513 | 12/1999 |
| DE | 19826315 | 12/1999 |
| DE | 19955722 | 5/2001 |
| DE | 10063305 | 9/2001 |
| DE | 10301678 | 8/2004 |
| EP | 0011991 | 11/1980 |
| EP | 0111632 | 6/1984 |
| EP | 0319781 | 6/1989 |
| EP | 0468394 | 1/1992 |
| EP | 0 617 500 | 9/1994 |
| EP | 0617500 | 9/1994 |
| EP | 0656612 | 6/1995 |
| EP | 0 833 756 | 4/1998 |
| EP | 0673102 | 7/1999 |
| EP | 0960410 | 12/1999 |
| EP | 1197887 | 4/2002 |
| FR | 2646021 | 10/1990 |
| GB | 824126 | 11/1959 |
| GB | 2034039 | 5/1980 |
| GB | 2 047 932 | 12/1980 |
| GB | 2047832 | 12/1980 |
| GB | 2047932 | 12/1980 |
| GB | 2095053 | 9/1982 |
| GB | 2254461 | 10/1992 |
| GB | 2259172 | 3/1993 |
| GB | 2350245 | 11/2000 |
| HU | 175853 | 10/1980 |
| JP | 45-009325 | 4/1970 |
| JP | 46-10442 | 3/1971 |
| JP | 46-010442 | 3/1971 |
| JP | 55147800 | 11/1980 |
| JP | 57-174950 | 10/1982 |
| JP | 6316731 | 2/1988 |
| JP | 63-78213 | 4/1988 |
| JP | 63-078213 | 4/1988 |
| JP | 1-091598 | 4/1989 |
| JP | 11-18162 | 5/1989 |

| | | |
|---|---|---|
| JP | 02040441 | 2/1990 |
| JP | 4-12905 | 2/1992 |
| JP | 42-61018 | 9/1992 |
| JP | 4-321399 | 11/1992 |
| JP | 4321399 | 11/1992 |
| JP | 5-009325 | 1/1993 |
| JP | 5-175568 | 7/1993 |
| JP | 05-64739 | 8/1993 |
| JP | 5-251785 | 9/1993 |
| JP | 6-233452 | 8/1994 |
| JP | 8-132321 | 5/1996 |
| JP | 08212484 | 8/1996 |
| JP | 8310207 | 11/1996 |
| JP | 08310207 | 11/1996 |
| JP | 9-322477 | 12/1997 |
| JP | 11-186885 | 7/1999 |
| JP | 2000-222668 | 8/2000 |
| JP | 2000-297567 | 10/2000 |
| SU | 506038 | 3/1976 |
| WO | WO 94/25681 | 11/1994 |
| WO | WO 95/15416 | 6/1995 |
| WO | WO95/29410 | 11/1995 |
| WO | WO 96/15590 | 5/1996 |
| WO | WO 96/28873 | 9/1996 |
| WO | WO 97/36364 | 10/1997 |
| WO | WO 98/36395 | 8/1998 |
| WO | WO 98/54766 | 12/1998 |
| WO | WO 99/12486 | 3/1999 |
| WO | WO 99/60364 | 11/1999 |
| WO | WO 99/66364 | 12/1999 |
| WO | WO 00/02741 | 1/2000 |
| WO | WO 01/67580 | 9/2001 |
| WO | WO 01/91315 | 11/2001 |
| WO | WO 02/42873 | 5/2002 |
| WO | WO 03/005388 | 1/2003 |
| WO | WO 03/007392 | 1/2003 |
| WO | WO 03/049148 | 6/2003 |

OTHER PUBLICATIONS

K. Bult, et al., "A Distributed, Wireless MEMS Technology for Condition Based Maintenance", Technology Showcase: Integrated Monitoring, Diagnostics and Failure Prevention, Proceedings of a Joint Conference, Mobile Alabama, Apr. 22-26, 1996, pp. 1-8.

Alexander Glas, "How to switch over from any 4 pin SMD SAW resonator to the new EPCOS SAW resonators R8xx in QCC4A SMD package (3.5mm x 5mm) Application Note #23", Dept. SAW CE AE PD, Version 1.0, Dec. 21, 2001, pp. 1-4.

Dr.-Ing. Ulrich Tietze et al., "Halbleiter-Schaltungstechnik", 5. Auflage 1980, pp. 454-455.

E. Grimsehl, "Lehrbuch der Physik", BAND 2, Elektrizitatslehre, 21 Auflage 1988, pp. 320-329.

H. Dispert et al., "Einführung in die Technische Informatik and Digitaltechnik", FH Kiel, 1995.

Drahtlos identifizieren, Elektronik 26/1995.

"Colloquium on RF and Microwave Components for Communication Systems" University of Bradford, Apr. 23, 1997.

Glynne-Jones, P. et al., "Self-powered systems: a review of energy sources", Sensor Review, vol. 21, No. 2, 2001, pp. 91-97.

Hollingum, J. "Autonomous radio sensor points to new applications", Sensor Review, vol. 21, No. 2, 2001, pp. 104-106.

Paradiso, J. et al., "A Compact, Wireless, Self-Powered Pushbutton Controller", Proc. 3 Intl conf. Ubiquitous Computing (Ubicom 2001), Springer-Verlag 2001, 6 pages.

Schmidt, F., "Batterielose Funksensoren, betrieben mit Energie aus der Umgebung", 11. ITG/GMA-Fachtagung Sensoren and Mess-Systeme, Ludwigsburg, Mar. 11-12, 2002.

Sinha, V., "Virginia-Based Electronics Research Firm to Work Manufacturer on Remotes", The Virginian-Pilot, Nov. 17, 2001, pp. 1-2.

Tietze, U. et al., "Halbleiter-Schaltungstechnik", 5. Auflage 1980; pp. 454-455.

"Siemens R&I/Environmentally Sensitive", NewWorld, IV/2000, pp. 1-7.

Aerospace Technology Innovation, Technology Transfer, "Water Wiggle Going Places", vol. 9, No. 3, May/Jun. 2001.

Microwaves & RF, Jan. 2001, 40, I, Sciences Module p. 5.

Carazo, A. V. et al., "Novel Piezoelectric-Based Power Supply for Driving Piezoelectric Actuators Designed for Active Vibration Damping Applications", Journal of Electroceramics, vol. 7, No. 3, Dec. 2001, pp. 1-3.

Schmidt, F., et al., "Wireless SAW Identification and Sensor Systems", International Journal of High Speed Electronics and Systems, vol. 10, No. 4 (2000) 1167-1175.

* cited by examiner

WIRELESS SENSOR SYSTEM

CROSS-REFERENCE TO RELATED APPLICATIONS

This is a continuation of U.S. patent application Ser. No. 10/492,327, filed Sep. 22, 2004 now U.S. Pat. No. 7,230,532, which is a U.S. National Stage of International Application No. PCT/DE02/03732, filed on Oct. 1, 2002. Priority is claimed to German patent application no. 101 50 128.5, filed Oct. 11, 2001.

BACKGROUND OF THE INVENTION

1. Field of the Invention

The invention relates to a sensor system which is not connected by wire ("wire-free"), to a monitoring system based on this sensor system, and to two uses of the sensor system.

2. Description of the Related Art

Until now, environmental changes have mainly been detected by sensors which pass on state information via wire lines, and are at the same time supplied with electrical power via these wire lines. The wiring, which is often complex and thus costly, is problematic in this case.

Battery-operated sensors are likewise known, which pass on the corresponding measured values by radio. However, these have the disadvantage that the batteries must be serviced. Particularly where there are a large number of devices to be monitored, the batteries cause logistic problems for servicing, as well as high costs.

DE 198 26 513 A1 (which corresponds to US Patent Application Publication No. 2001/003163) discloses an automation system for control of a processing apparatus having a radio sensor which is used to reduce the installation complexity. For this purpose, it has a radio sensor which can be operated by means of a solar cell, possibly in conjunction with an energy store.

SUMMARY OF THE INVENTION

An object of the present invention is to provide an improved capability for power-saving status checking, which can be implemented such that it can be installed easily.

This and other objects are attained in accordance with one aspect of the present invention directed to a sensor system having at least one voltage generator for conversion of non-electrical energy to electrical energy, for example a solar cell, an inductive element or a piezoelement. There is therefore no need for a battery to operate it. The voltage generator is followed by at least one energy store, for example a rechargeable battery or a capacitor. The energy store is connected to at least one voltage converter, which converts the stored energy to an output signal which is suitable for operation of a processor controller. For example, the voltage converter could cut off voltage peaks which would damage the processor controller. In addition, at least one sensor is provided which detects the desired state, for example a light intensity sensor, a contact sensor or a position sensor. Furthermore, at least one transmitter is provided for wire-free transmission of transmission messages, in particular in the form of radio signals. The transmission messages can be produced by means of the processor controller and contain at least one measured value from the at least one sensor. However, they may also contain two or more measured values, for example from two or more sensors.

The sensor system also contains a timer circuit, which can be triggered as a function of a state value, for example of a voltage level, of the at least one energy store, and which activates the sensor system in order to transmit at least one transmission message after a time interval which is determined by it.

In accordance with an embodiment of the invention, the time interval may, for example, either be fixed and predetermined by the design of the timer circuit or may be redefined variably on each activation by the processor circuit. For this purpose, in particular, the state of charge of the energy store may be checked and included in the definition of the transmission frequency per unit time, in order to allow the sensor to be operated for periods which are as long as possible. After its activation, the energy should typically be sufficient to operate the running timer circuit even if the external energy supply then fails, for example if it becomes cloudy and a solar cell is being used.

It is particularly advantageous if the sensor can also be operated as a voltage generator, because this allows the number of components to be reduced, and thus the susceptibility to faults.

It is advantageous for at least one voltage generator to be a solar cell, because this allows for an energy supply which operates throughout the year. The solar cell is particularly advantageous for illumination measurement because, in this case, it can be used as a voltage generator and as an illumination sensor at the same time.

It is also advantageous for at least one voltage generator to be a piezoelectric transducer and/or an inductive converter, because this provides a low-cost energy source. Particularly in the case of position finding, for example for doors, windows and the like, it is advantageous for this voltage generator to be used as a sensor for position finding at the same time. It is advantageous in order to achieve a long operating life for a solar cell also to be provided as a voltage generator.

To achieve a long time interval and/or to provide two or more activation cycles even when the energy supply is low or has failed, it is advantageous for the timer circuit to have semiconductor modules based on ULP ("Ultra Low Power") technology.

To identify the sensor, particularly when two or more sensors and/or sensor systems are used at the same time, it is advantageous for the transmission message also to contain at least one identification code.

Furthermore, the above-mentioned object is achieved by a monitoring system which contains at least one sensor system as described above, as well as at least one receiving and evaluation system. The sensor system typically passes information on by means of the transmission message without the use of wires, for example by radio, to a receiving and evaluation system which is connected to the electrical mains system. The receiving and evaluation system is, for example, an illumination controller, or it contains display elements, bus systems and/or actuators (louvre control etc.). The receiving and evaluation system may advantageously monitor two or more sensor systems.

The above-mentioned object is also achieved by the use of the sensor system and/or of the monitoring system for position finding, for example for windows, doors or other moving devices in buildings. This use is becoming increasingly important for reasons related to safety, energy saving and in order to increase the convenience in both commercial premises and in the field of private dwellings. In this case, it is advantageous if the sensor can also be used as a voltage generator, particularly if it contains an inductive or piezoelectric element. Other elements, for example electrostrictive or magnetostrictive elements, are also generally feasible.

The above-mentioned object is also achieved by the use of the sensor system and/or of the monitoring system for illumination signaling, with the voltage generator and the sensor in particular at least partially including the same solar cell; the solar cell is then used as a combined voltage generator and illumination sensor. The illumination intensity at workstations, in commercial premises, in private households, on public roads, in public squares, and in installations etc. is being controlled to an increasing extent as a function of the daylight incidence, in order on the one hand to achieve optimum lighting quality and in order on the other hand to save energy. The discovery makes it possible, for example, to switch on the illumination in the outdoor area or in buildings.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sensor system and the monitoring system will be explained schematically in more detail in the following exemplary embodiments. In the drawings, wherein like reference characters denote similar elements throughout the several views.

DETAILED DESCRIPTION OF THE PRESENTLY PREFERRED EMBODIMENTS

Figure 1:
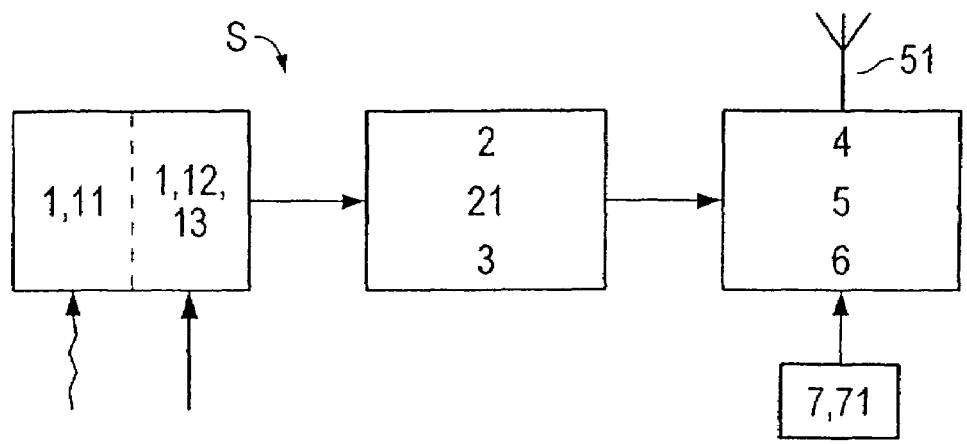
FIG. 1 is a schematic block diagram showing a sensor system for a position sensor.

FIG. 1 shows a block diagram of a sensor system S for position finding. The wire-free sensor system S passes on information by radio to actuators, bus systems or display elements, which are typically connected to the electrical mains system. The power for operation of the sensor system S together with the associated radio transmitter 5 is supplied from the ambient lighting and/or from the mechanical movement of the devices to be monitored, so that there is no need for a battery to operate it.

A voltage generator 1 in the form of a solar cell 11 (in general: a photovoltaic element) produces an electrical voltage when light falls on it. This is designed such that a voltage of about two volts is emitted even when the illumination intensities are low. For cost reasons, the solar cell 11 is preferably chosen to be sufficiently small that the processor controller 4 cannot be operated directly from it continuously. This is possible, for example, when low frequency is used for how often the sensor system S transmits its signal. This greatly reduces the energy which is required, for example, for operation in one day. In order nevertheless to obtain as much power as possible, an energy store 2, preferably a low-loss capacitor of high capacitance or an electrochemical storage cell, is first of all charged with electrical energy to supplement the solar cell. The design in conjunction with the solar cell 11 is in this case chosen such that it is reliably possible to bridge even extremely dark phases, such as those which may occur in winter.

Furthermore, this exemplary embodiment additionally makes use of one or more energy converters 2 which convert the movement energy (thick arrow) of the device to be monitored (for example pressing of door catches, opening or closing of windows or doors) to electrical energy for feeding the sensor system S. Piezoelectric transducers 12, inductive converters 13 and, as a special case of them, a so-called Wiegand element may be used, in particular, for this purpose (see www.hta-be.bfh.ch/~felser/stadium).

When the voltage of the energy store 2 reaches a sufficient level, then a timer circuit 6 is activated which now activates the entire sensor system S with the processor controller 4 and the transmitter 5 at sensible intervals. The time interval is either predetermined and is fixed by the design of the timer circuit 6 or is redefined by the processor controller 4 on each activation. For this purpose, in particular, the state of charge of the energy store 2 can be checked and can be included in the definition of the transmission frequency per unit time, in order to allow the sensor system S to be operated for periods which are as long as possible during dark phases. A voltage converter 3 provides the approximately constant voltage, which is required for operation of the processor controller 4 and advantageously of the transmitter 5 as well, during each of the short operating phases.

On each activation, the state of the device being monitored is measured at that time by means of a sensor 7. The measurement may, for example, produce binary information (door open or closed, etc.) or else one or more analog measured values (opening angle of the window etc.). The result is coded together with an identification number for the sensor system S into a radio transmission message, which is transmitted from the radio-frequency transmitter 5 via the connected antenna 51. The radio transmission message may have redundancies included, in order to improve the transmission reliability. Other types of wire-free transmission may also be used instead of radio transmission, for example IR light.

It is likewise preferable to provide a storage circuit 21 which can carry out energy management without the timer 6.

The processor 4, which can be a microprocessor, regulates the transmission of information according to the energy management of storage circuit 21 or timer 6 and the information load to be transmitted.

The timer circuit 6 is advantageously designed for an extremely low power demand, since it operates continuously as a single component. Either an analog or a digital timer circuit 6 may be used.

All sensors 7 which can be checked by the processor, for example via an A/D converter module, may be used as position sensors 71. For binary position finding, these are preferably reed contacts, which respond to a magnetic field from a permanent magnet which is connected to the moving part. Inductive or rotation angle sensors, for example, are suitable for analog position finding purposes.

The transmitter 5 preferably essentially comprises a transmission stage with a radio-frequency oscillator which can start to oscillate very quickly. It preferably operates with an SAW resonator as the frequency-determining component. The transmitter 5 is designed for a very low current consumption and operates with a comparatively wide bandwidth, in order to keep the transmission duration short. The wide bandwidth allows very short transmission times, and thus low energy consumption.

Figure 2:
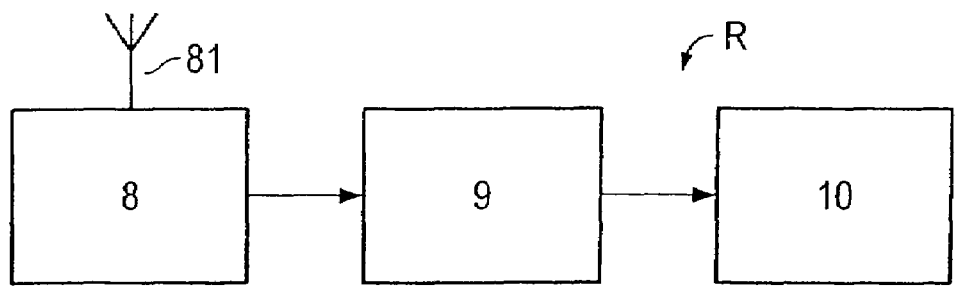
FIG. 2 is a schematic block diagram showing an associated receiving and evaluation system.

FIG. 2 shows a block diagram of the associated receiving and evaluation system R. The receiving system comprises a radio-frequency receiver 8 and a processor-based signal processing unit 9. It receives the messages which are transmitted from the sensor, and are temporarily stored and processed.

The radio signal from the sensor system is typically received via the antennas 81 by all of the associated radio-frequency receivers 8 located in that vicinity, and are evaluated with processor assistance. After evaluation, only the receiver systems which have been addressed react and, via a suitable coupling 10, such as a bus system result in an action from the alarm transmitter, drive and actuator (for example heating valves when a window is open) or feed the measurement data to a bus system, for example a PLC bus, for further storage and processing.

Error-tolerant transmission methods are preferably used for data transmission, particularly those with forward error correction or block-oriented redundancy methods. An option for data encryption is advantageous. It is advantageous to transmit the data in a very short time in order to provide protection against collisions when two or more sensors are located in the reception area of receiving electronics. A position indicating value, an identification number and, possibly, further data such as the time etc. are transmitted, by way of example.

The data is transmitted at fixed or variable time intervals even without any movement of the devices being monitored, but data transmission can also be triggered in each case by a state change of these devices.

Figure 3:
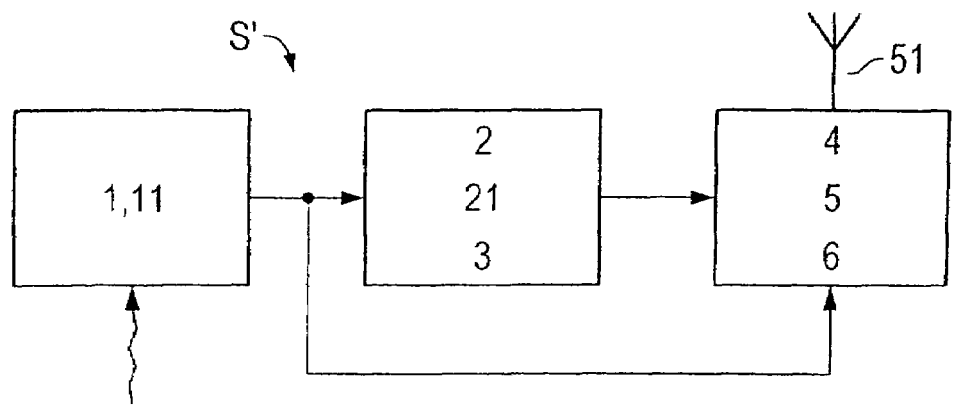
FIG. 3 is a schematic block diagram showing a sensor system for an illumination sensor.

FIG. 3 shows a block diagram of an illumination sensor system. The illumination intensity at workstations, in commercial premises, in private households, on public roads, in public squares, and in installations etc. is being controlled to an increasing extent as a function of the daylight incidence, in order on the one hand to achieve optimum illumination quality and in order on the other hand to save energy.

In contrast to the sensor system shown in FIG. 1, there is no mechanically activated voltage generator 12, 13 in this case. In fact, the solar cell 11 is used exclusively as a voltage generator 1 and sensor 7. Whenever it is activated, the illumination intensity is measured at that time via the solar cell 11. The result is coded together with the identification number of the sensor 11 into a radio message, which is transmitted by the radio frequency transmitter 5 via the connected antenna 51. The radio message may have redundancies included, to improve the transmission reliability.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A sensor system, comprising:
   a least one voltage generator for conversion of non-electrical energy to electrical energy,
   at least one energy store connected to the voltage generator,
   at least one voltage converter having an input connected to the energy store and generating an output,
   at least one sensor for outputting a measured value from a monitored device,
   at least one transmitter configured for wire-free transmission of transmission messages which contain at least one measured value from the at least one sensor and an identification code related to the sensor which outputs the measured value, and
   a timer circuit configured to activate the sensor system to transmit at least one of the transmission messages, the at least one transmitter and the timer circuit being powered by the output of the at least one voltage converter,
   the sensor system being configured for periodically transmitting the transmission messages with a transmission frequency, wherein the transmission frequency is controlled by at least one of the timer circuit and the monitored device.

2. The sensor system of claim 1, wherein the at least one voltage generator is a solar cell.

3. The sensor system of claim 1, wherein the at least one voltage generator is at least one of a piezoelectric transducer or an inductive converter.

4. The sensor system of claim 1, wherein the timer circuit includes semiconductor modules based on Ultra Low Power (ULP) technology.

5. The sensor system of claim 1, wherein the timer circuit is activated in response to a voltage level of the energy store.

6. The sensor system of claim 1, wherein the sensor is a part of the at least one voltage generator.

7. The sensor system of claim 1, wherein the transmission frequency is based on a state of charge of the at least one energy store.

8. The sensor system of claim 1, further comprising a processor controller coupled to the at least one sensor and the at least one transmitter, the processor controller being configured to control the transmission frequency of the transmission messages.

9. The sensor system of claim 1, wherein the transmission frequency is variable.

10. The sensor system of claim 9, wherein the time interval varies as a function of the state of charge of the at least one energy store.

11. A monitoring system comprising at least one sensor system as recited in claim 1, and at least one receiving and evaluation system configured to receive the transmission messages transmitted by the at least one sensor system.

12. A method for control the transmission frequency for a sensor system as recited in claim 7, the method comprising:
   checking the state of charge of the energy store; and
   including the state of charge in the definition of the transmission frequency.

13. A sensor system, comprising:
   a least one voltage generator for conversion of non-electrical energy to electrical energy,
   at least one energy store connected to the voltage generator,
   at least one voltage converter having an input connected to the energy store and generating an output,
   at least one sensor for outputting a measured value from a monitored device,
   at least one transmitter configured for wire-free transmission of transmission messages which contain at least one measured value from the at least one sensor and an identification code related to the sensor which outputs the measured value, and
   a timer circuit configured to activate the sensor system to transmit at least one of the transmission messages, the at least one transmitter and the timer circuit being powered by the output of the at least one voltage converter, wherein the messages are transmitted at one of a fixed time interval and a variable time interval, and are triggered by a state change of the device being monitored, and the sensor system being configured for transmitting the transmission messages with a transmission frequency, wherein the transmission frequency controlled by at least one of the timer circuit and the monitored device.

* * * * *